(12) United States Patent
Salihbegovic et al.

(10) Patent No.: US 11,255,157 B2
(45) Date of Patent: Feb. 22, 2022

(54) CHEMICAL INJECTION VALVE WITH STEM BYPASS FLOW

(71) Applicant: WEATHERFORD TECHNOLOGY HOLDINGS, LLC, Houston, TX (US)

(72) Inventors: Zlatko X. Salihbegovic, New Iberia, LA (US); Lance Racca, Rayne, LA (US); Donald M. King, Lafayette, LA (US)

(73) Assignee: Weatherford Technology Holdings, LLC, Houston, TX (US)

( * ) Notice: Subject to any disclaimer, the term of this patent is extended or adjusted under 35 U.S.C. 154(b) by 205 days.

(21) Appl. No.: 15/799,039

(22) Filed: Oct. 31, 2017

(65) Prior Publication Data

US 2018/0142532 A1 May 24, 2018

Related U.S. Application Data

(60) Provisional application No. 62/424,906, filed on Nov. 21, 2016.

(51) Int. Cl.
*E21B 34/10* (2006.01)
*F16K 17/16* (2006.01)
(Continued)

(52) U.S. Cl.
CPC ............ *E21B 34/10* (2013.01); *E21B 34/063* (2013.01); *E21B 37/06* (2013.01); *E21B 41/02* (2013.01);
(Continued)

(58) Field of Classification Search
CPC ................................ F16K 47/04; E21B 34/105
See application file for complete search history.

(56) References Cited

U.S. PATENT DOCUMENTS 3,363,581 A * 1/1968 Kork Kelley ......... E21B 43/123
137/155
4,260,020 A * 4/1981 Nelson .................... E21B 25/00
166/305.1
(Continued)

FOREIGN PATENT DOCUMENTS

| EP | 2990592 A1 | 3/2016 |
| GB | 2344364 A | 6/2000 |
| WO | 2015063133 A1 | 5/2015 |

OTHER PUBLICATIONS

Office Action dated Jun. 17, 2019 for U.S. Appl. No. 15/799,176, 21 pages.
(Continued)

*Primary Examiner* — Steven A MacDonald
(74) *Attorney, Agent, or Firm* — Smith IP Services, P.C.

(57) ABSTRACT

A chemical injection valve can include a valve stem, flow between sections of a flow passage being prevented and permitted in respective closed and open positions of the valve stem, a resilient primary seal that prevents flow through an annular gap surrounding the valve stem in the closed position, and a bypass passage in communication with the annular gap and a flow passage section, and in communication with another flow passage section in the open position. A chemical injection system can include a chemical treatment pumped through a chemical injection valve and into an interior of a tubular string, and the chemical injection valve including a valve stem and a bypass passage extending between a flow passage section and an annulus surrounding the valve stem, the annulus being positioned longitudinally between a resilient primary seal and a metal secondary seal.

20 Claims, 6 Drawing Sheets

(51) Int. Cl.
  *E21B 34/06* (2006.01)
  *E21B 37/06* (2006.01)
  *E21B 41/02* (2006.01)
  *F16K 17/04* (2006.01)
  *F16K 17/40* (2006.01)
  *F16K 47/04* (2006.01)

(52) U.S. Cl.
  CPC ........ *F16K 17/0466* (2013.01); *F16K 17/162* (2013.01); *F16K 17/40* (2013.01); *F16K 17/403* (2013.01); *F16K 47/04* (2013.01)

(56) References Cited

U.S. PATENT DOCUMENTS

| | | | | |
|---|---|---|---|---|
| 4,360,064 A * | 11/1982 | O'Connor, III | ......... | E21B 34/10 166/319 |
| 4,480,687 A * | 11/1984 | Terral | ...... | E21B 23/03 166/117.5 |
| 4,562,854 A * | 1/1986 | Pringle | ...... | E21B 34/06 137/155 |
| 4,565,215 A * | 1/1986 | Cummings | ...... | E21B 34/06 137/155 |
| 5,004,007 A * | 4/1991 | Johnson | ...... | E21B 34/06 137/155 |
| 6,880,639 B2 | 4/2005 | Rhodes et al. | | |
| 7,647,975 B2 * | 1/2010 | Messick | ...... | E21B 43/123 166/372 |
| 7,814,982 B2 * | 10/2010 | Moyes | ...... | E21B 43/123 166/373 |
| 2005/0126638 A1 | 6/2005 | Gilbert | | |
| 2009/0217988 A1 | 9/2009 | Maxwell | | |
| 2010/0224807 A1 * | 9/2010 | Brizes | ...... | F16K 1/36 251/63.6 |
| 2012/0103608 A1 | 5/2012 | Van Petegem et al. | | |
| 2012/0204977 A1 | 8/2012 | Lembcke | | |
| 2013/0032226 A1 * | 2/2013 | Salihbegovic | ...... | E21B 43/123 137/511 |
| 2016/0003005 A1 * | 1/2016 | Pickle | ...... | E21B 34/10 166/374 |
| 2016/0053579 A1 | 2/2016 | Salihbegovic | | |
| 2017/0254177 A1 | 9/2017 | Woodford | | |

OTHER PUBLICATIONS

International Search Report with Written Opinion dated Feb. 19, 2019 for PCT Patent Application No. PCT/US2018/057002, 13 pages.
International Search Report with Written Opinion dated Feb. 21, 2018 for PCT Patent Application No. PCT/US2017/061086, 15 pages.
Specification and drawings for U.S. Appl. No. 15/799,176, filed Oct. 31, 2017, 31 pages.
Weatherford; "Tubing-Retrievable Chemical-Injection Valve", company article No. 3004.00, dated 2005, 2 pages.
Weatherford; "Chemical-Injection Side-Pocket Mandrels—Round, Solid-Body", company article No. 3011.01, dated 2005-2007, 4 pages.
Weatherford; "Tubing-Retrievable Chemical-Injection Mandrels", company article No. 3005.00, dated 2006, 3 pages.
Search Report dated Jun. 22, 2020 in European Patent Application No. 17872556.0, 9 pages.

* cited by examiner

CHEMICAL INJECTION VALVE WITH STEM BYPASS FLOW

CROSS-REFERENCE TO RELATED APPLICATION

This application claims the benefit of the filing date of U.S. provisional application No. 62/424,906 filed on 21 Nov. 2016. The entire disclosure of this prior application is incorporated herein by this reference.

BACKGROUND

This disclosure relates generally to equipment utilized and operations performed in conjunction with a subterranean well and, in examples described below, more particularly provides for stem bypass flow and seal longevity in a downhole chemical injection valve.

A chemical injection valve can be used to control injection of a chemical treatment into fluids produced from a well. The chemical treatment is typically in the form of a liquid composition selected for certain benefits (such as, corrosion resistance, paraffin mitigation, etc.) to be derived from its mixture with the produced fluids.

The control over the chemical treatment injection implemented by use of the chemical injection valve is preferably consistent and predictable, so that sufficient chemical treatment is injected to obtain the desired benefits, and excess chemical treatment is not injected (which would potentially be costly and wasteful).

Therefore, it will be appreciated that improvements in the art of constructing and utilizing chemical injection valves are continually needed. Such improvements may be useful in a variety of different well configurations and operations, and not exclusively in hydrocarbon production operations.

DETAILED DESCRIPTION

Figure 1:
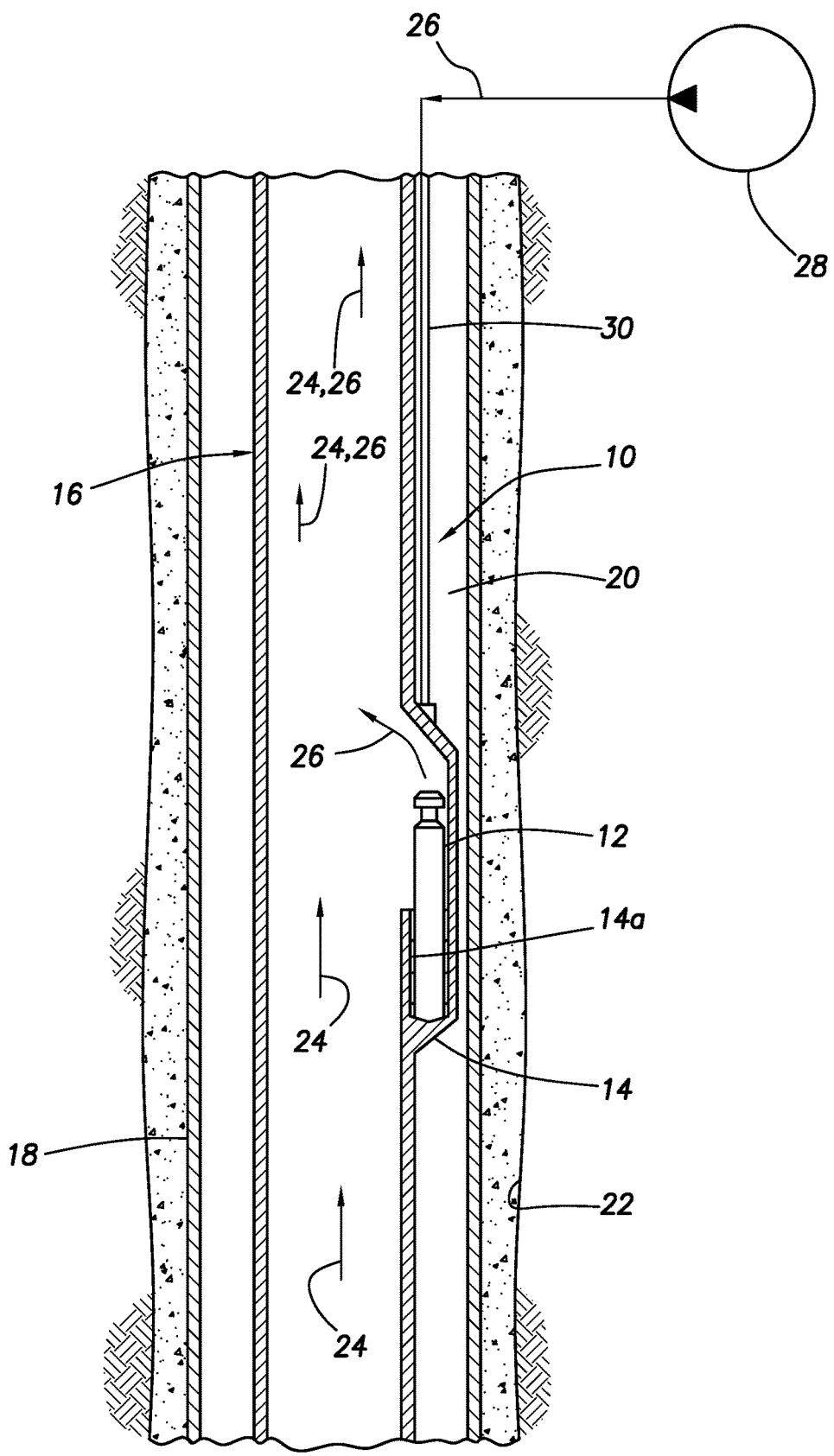
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a chemical injection valve 12 is installed in a seal bore 14a of a conventional side pocket mandrel 14 connected as part of a tubular string 16 in the well. The tubular string 16 may be substantially continuous or segmented, may be made of steel, composite or other materials, and may be of the types known to those skilled in the art as production tubing, conduit, pipe or other tubulars.

As depicted in FIG. 1, the tubular string 16 is positioned inside a liner or casing 18, so that an annulus 20 is formed between the tubular string 16 and the casing 18. The casing 18 is cemented in a wellbore 22. However, in other examples, the liner or casing 18 may not be cemented in the wellbore 22, the wellbore may be deviated or horizontal, etc. Thus, the scope of this disclosure is not limited to any particular details of the well or any of its components as depicted in the example of FIG. 1.

Production fluid 24 (such as, oil, gas, water, gas condensates, combinations thereof, etc.) flows through the tubular string 16 toward the earth's surface (e.g., to a land or water-based production facility, pipeline or rig). The chemical injection valve 12 is used to control injection of a chemical treatment 26 into the tubular string 16, so that the production fluid 24 and/or an interior of the tubular string is treated as the production fluid flows toward the surface.

The chemical treatment 26 may serve any of a variety of different purposes or combination of purposes. For example, the chemical treatment 26 may inhibit paraffin formation in the fluid 24, inhibit corrosion in the tubular string 16 or surface equipment, serve as a surfactant, prevent undesired precipitation of substances from the fluid, etc. The scope of this disclosure is not limited to any particular purpose or combination of purposes for the chemical treatment 26.

In the FIG. 1 example, the chemical treatment 26 is delivered to the chemical injection valve 12 by a pump 28, which flows the chemical treatment 26 through an umbilical or control line 30 extending along the tubular string 16 to the side pocket mandrel 14. In other examples, the chemical treatment 26 could be flowed through the annulus 20 from the surface, without use of the control line 30, or the control line could be otherwise positioned.

Figure 2:
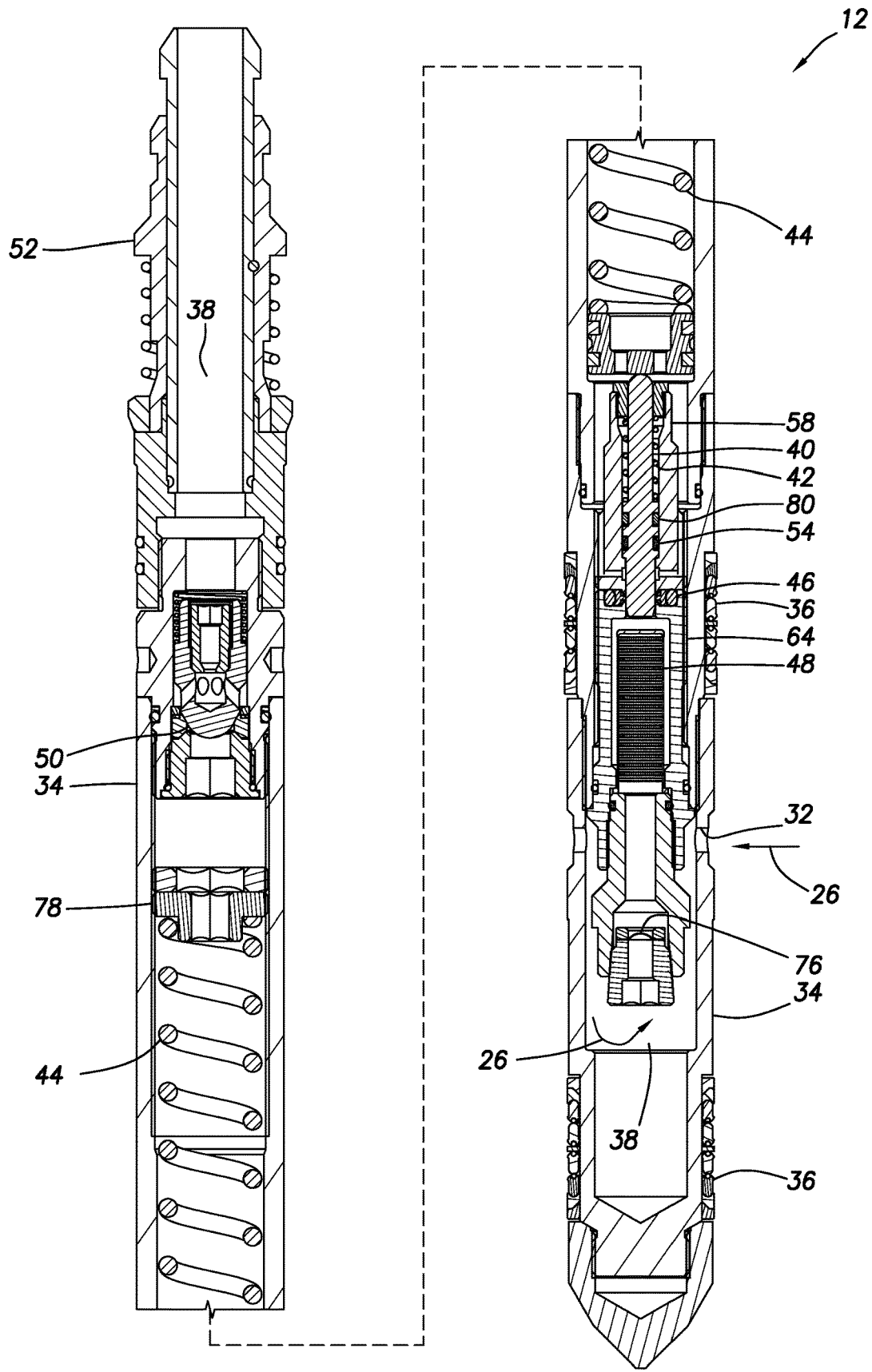
FIG. 2 is a representative cross-sectional view of an example of a chemical injection valve that may be used with the system and method of FIG. 1, and which can incorporate the principles of this disclosure.

Referring additionally now to FIG. 2, a cross-sectional view of an example of the chemical injection valve 12 is representatively illustrated. The valve 12 is described below as it may be used in the FIG. 1 system 10 and method. However, the FIG. 2 chemical injection valve 12 may be used in other systems and methods, in keeping with the principles of this disclosure.

In the FIG. 2 example, the valve 12 receives the chemical treatment 26 via ports 32 formed through a generally tubular outer housing assembly 34 between two longitudinally spaced apart external seal assemblies 36. In the FIG. 1 system 10, the seal assemblies 36 are sealingly engaged in the seal bore 14a of the side pocket mandrel 14.

The chemical treatment 26 flows into an internal longitudinal flow passage 38 of the valve 12. The chemical treatment 26 is filtered by flowing through a filter 48.

A rupture disc 76 initially blocks upward flow of the chemical treatment 26 through the flow passage 38 to the filter 48. After the chemical injection valve 12 has been installed in the side pocket mandrel 14, pressure can be applied by the pump 28 to the control line 30, in order to increase a pressure differential from below to above the rupture disc 76, and eventually burst the rupture disc and permit the chemical treatment 26 to flow further upward through the flow passage 38.

A valve stem 40 blocks flow of the chemical treatment 26 through the passage 38 to an upper section of the valve 12, unless a pressure differential from below to above the stem 40 (as viewed in FIG. 2) is great enough to overcome a biasing force exerted by biasing devices 42, 44 (depicted in FIG. 2 as coiled compression springs, but other types of biasing devices may be used, if desired). A longitudinally adjustable stop 78 provides for adjusting the biasing force exerted by the biasing device 44, and thereby provides for adjusting the pressure differential required to upwardly displace the stem 40.

When closed, the stem 40 is sealingly engaged with a primary resilient seal 46. The primary seal 46 is "resilient" in that a resilient material of the primary seal sealingly engages a sealing surface on another component (in this case an external surface or outer diameter of the stem 40). The resilient material could comprise, for example, an elastomer (such as, a nitrile or fluoro-elastomer material) or other material having suitable elasticity and sealing capability (including suitability for exposure to the chemical treatment 26).

As used herein, the term "resilient seal" does not require the seal to be made entirely of resilient material (for example, the seal could comprise a spring, plastic or composite material for energizing the seal (e.g., biasing it into sealing contact with the stem 40), preventing extrusion, etc.). However, the scope of this disclosure is not limited to use of a resilient primary seal.

When the stem 40 displaces upward in response to the pressure differential across the stem being at or above a predetermined level sufficient to overcome the biasing forces exerted by the biasing devices 42, 44, flow through the passage 38 to the upper section of the valve 12 is permitted. The chemical treatment 26 flows upward through a back-flow preventing check valve 50, and then through a tubular fishing neck 52 and into an interior of the tubular string 16. The chemical treatment 26 mixes with the produced fluid 24 as it flows toward the surface.

The chemical injection valve 12 example depicted in FIG. 2 uses an elastomer or other resilient seal material in the primary seal 46, and can use a metal-to-metal redundant or secondary seal 54. This arrangement achieves complete valve closing (with complete absence of flow through the valve 12), due to the resilient primary seal 46, with the durable metal secondary seal 54 sealing between the stem 40 and an inner stem housing 58 throughout operation of the valve 12.

If desired, another resilient secondary seal 80 may be used to seal between the stem 40 and the stem housing 58. As depicted in FIG. 2, the seals 54, 80 are carried on the stem 40 for sliding and sealing engagement with an interior surface of the stem housing 58, but in other examples these seals could instead be installed in the stem housing for sliding and sealing engagement with the stem 40.

Note that the specific combination, configuration and arrangement of valve 12 components depicted in FIG. 2 may be different in other examples. Thus, the scope of this disclosure is not limited to only the particular components or combination of components of the chemical injection valve 12 as described herein or depicted in the drawings.

Figure 3:
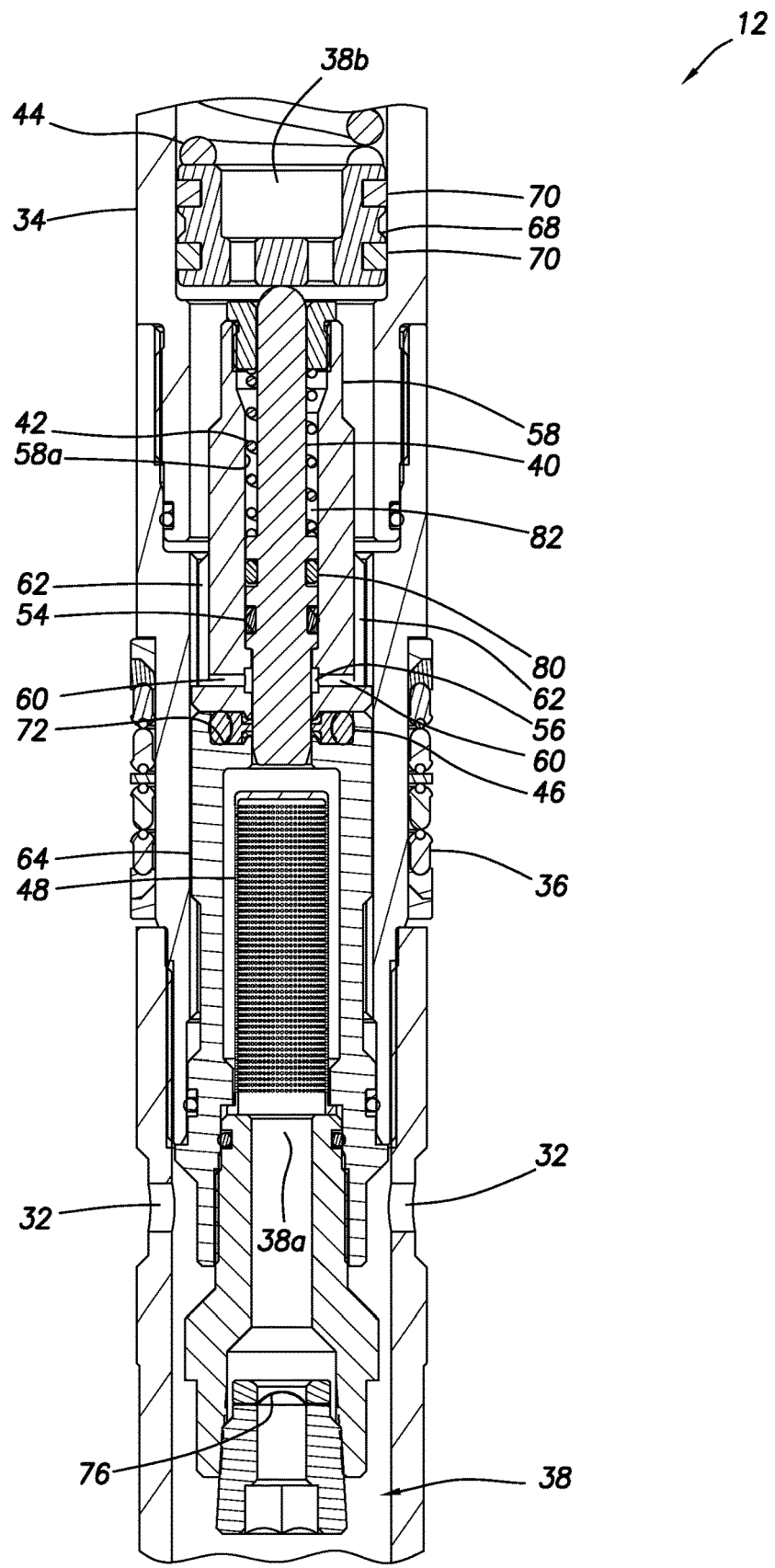
FIG. 3 is a representative cross-sectional view of a portion of the FIG. 2 chemical injection valve in a closed configuration.

Referring additionally now to FIG. 3, a more detailed, enlarged cross-sectional view of a portion of the chemical injection valve 12 is representatively illustrated. The valve 12 is depicted in a closed configuration in FIG. 3.

In the FIG. 3 example, the secondary seals 54, 80 are positioned in annular grooves formed on the stem 40. The secondary seals 54, 80 continuously engage an interior surface 58a in the stem housing 58 as the stem 40 displaces between its closed and open positions. Thus, flow through an annular space 82 between the stem 40 and the stem housing 58 is continuously prevented during operation of the valve 12.

The metal secondary seal 54 may comprise a metal or metal alloy, to produce metal-to-metal sealing with the stem housing interior surface 58a, and to thereby prevent flow through the annular space 82. The seal 54 is referred to herein as a "metal" seal, in that the metal or metal alloy of the seal sealingly engages another component (in this case the interior surface 58a of the stem housing 58).

The term "metal seal" as used herein does not require that the seal 54 is made entirely of metal (for example, the seal could comprise a resilient material that biases a metal or metal alloy component into contact with the interior surface 58a of the stem housing 58). However, the scope of this disclosure is not limited to use of a metal secondary seal.

Note that bypass passages 60 are in communication with an annulus 56 formed radially between the stem 40 and the stem housing 58, and positioned longitudinally between the primary resilient seal 46 and the metal secondary seal 54. The bypass passages 60 are also in communication with longitudinally extending recesses 62 formed on an exterior of the stem housing 58.

It will, thus, be readily appreciated that, when the stem 40 displaces upward and disengages from the primary resilient seal 46, after the rupture disc 76 has burst, the chemical treatment 26 can flow from a lower section 38a of the passage 38 to an upper section 38b of the passage 38 via the bypass passages 60, while the seals 54, 80 remain sealingly engaged in the stem housing 58.

When injection pressure is applied (such as, via the pump 28 and control line 30, see FIG. 1), the biasing devices 42, 44 are compressed and the valve 12 opens for flow of the chemical treatment 26 to the upper section 38b of the flow passage 38. The chemical treatment 26 flow is directed to bypass the stem 40 via the bypass passages 60. The flow also bypasses the resilient primary seal 46 when the valve 12 is fully open, in that the stem 40 remains sealingly engaged in the stem housing 58 by the secondary seal 54 when the primary seal 46 is not sealingly engaged with the stem.

When the valve 12 starts to open, the flow is directed through a narrow annular gap 66 (see FIG. 5) between an outer diameter of the stem 40 and an inner diameter of the housing 58 (just above the primary seal 46 as depicted in FIG. 3). This creates significant flow resistance until the stem 40 is displaced away from the primary resilient seal 46, opening a larger bypass flow path (via the bypass passages 60 and recesses 62) for increased flow.

At this point (the valve 12 partially open), the stem 40 can oscillate (e.g., with piston pump-produced pressure impulses) proximate a lower edge of the annulus 56 that communicates with the bypass passages 60 longitudinally spaced apart from the resilient primary seal 46. In this manner, the primary seal 46 does not engage the stem 40 during injection of the chemical treatment 26 while the valve 12 is open or partially open. It is expected that a longer distance between the annulus 56 and the primary seal 46 (that is, a longer distance of a relatively small annular gap 66 between the stem 40 and the stem housing 58) will provide for less flow erosion of the primary seal.

Note that the inner diameter of the stem housing 58 (at the interior surface 58a) is greater than the outer diameter of the stem 40 where it is sealingly engaged by the primary seal 46 in the FIG. 3 example. Thus, less pressure differential across the stem 40 is required to maintain the stem in an open or partially open position, as compared to the pressure differential required to displace the stem upward while it is sealingly engaged by the primary seal 46.

This helps to prevent the primary seal 46 from engaging the stem 40 during injection of the chemical treatment 26.

The valve stem 40 and the secondary metal seal 54 can comprise metals and alloys that are resistant to erosion. Once flow stops, the biasing devices 42, 44 can expand and push the stem 40 into the resilient primary seal 46, and completely close the valve 12 to flow of the chemical treatment 26.

The valve stem 40 in this example enters the primary seal 46 and displaces therein a certain distance (for example, approximately 4 mm) to completely close the valve 12. The primary resilient seal 46 is preferably annular shaped and completely blocks flow through the annular gap 66 (see FIG. 5) upon initial contact with the valve stem 40.

The primary resilient seal 46 in the FIG. 3 example is retained in an annular recess 72 formed in an upper end of the filter housing 64, and positioned longitudinally between the stem housing 58 and the filter housing 64. The seal 46 is captive between the housings 58, 64, which helps to prevent dislodging of the seal due to high velocity flow through the passage 38.

The secondary seal 54 can be a wedge-type seal comprising one or more wedge or conical shaped metal or metal alloy components that are biased into sealing contact with the stem housing interior surface 58a. However, the scope of this disclosure is not limited to use of any particular configuration or material for the secondary seal 54 in the valve 12.

The seal 54 preferably remains engaged between the valve stem 40 and the stem housing 58 continuously while the valve 12 is in its open, partially open and closed configurations. This dynamic secondary seal 54 has a known sealing diameter (in this example, at the interior surface 58a of the stem housing 58), which results in a precise, predictable differential pressure to maintain the valve 12 in its open configuration.

The biasing force exerted by the biasing device 44 is transmitted to the stem 40 via a reciprocably displaceable member 68. Carried in annular grooves on an outer diameter of the member 68 are friction-reducing rings 70 (comprising relatively low friction materials, such as, PTFE, PEEK, etc.). By reducing friction in the application of the biasing device 44 biasing force to the stem 40, and friction in the stem's upward displacement in response to the pressure differential across the stem, the pressures at which the valve 12 opens and closes are more predictable and consistent.

Figure 4:
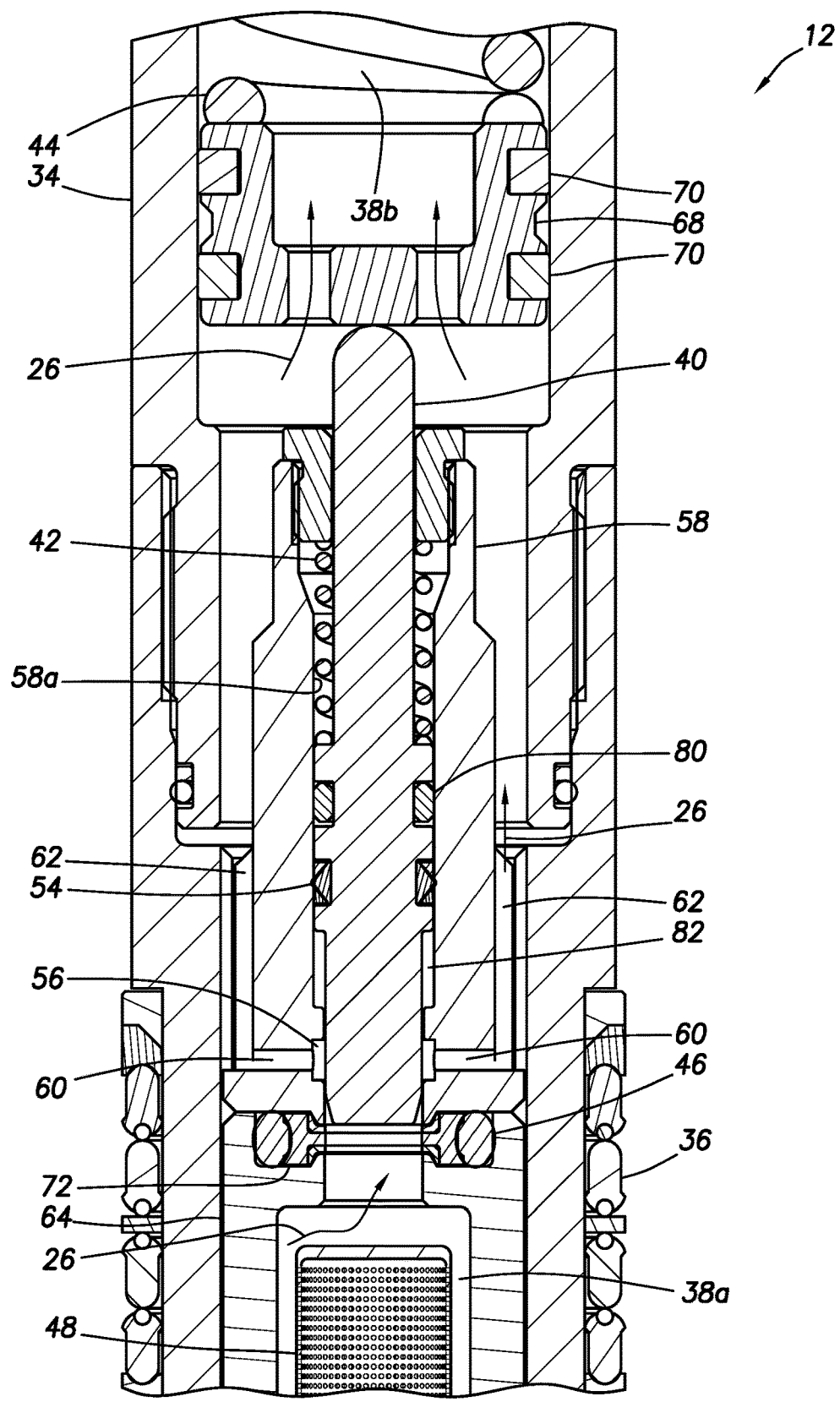
FIG. 4 is a representative cross-sectional view of a portion of another example of the chemical injection valve in a partially open configuration.

Referring additionally now to FIG. 4, a further detailed and enlarged cross-sectional view of a portion of the chemical injection valve 12 is representatively illustrated. In this view, the valve 12 is in a partially open configuration, with the chemical treatment 26 flowing upward from the passage lower section 38a to the passage upper section 38b via the bypass passages 60.

In the partially open configuration of FIG. 4, the rupture disc 76 (see FIG. 3) has been burst by applying a predetermined pressure differential across the rupture disc. After the rupture disc 76 is burst, a sufficient differential pressure is applied across the stem 40 (across the lower outer diameter of the stem at its sealing engagement with the primary seal 46) to overcome the downwardly directed biasing forces exerted by the biasing devices 42, 44, so that the stem is displaced upward.

Figure 5:
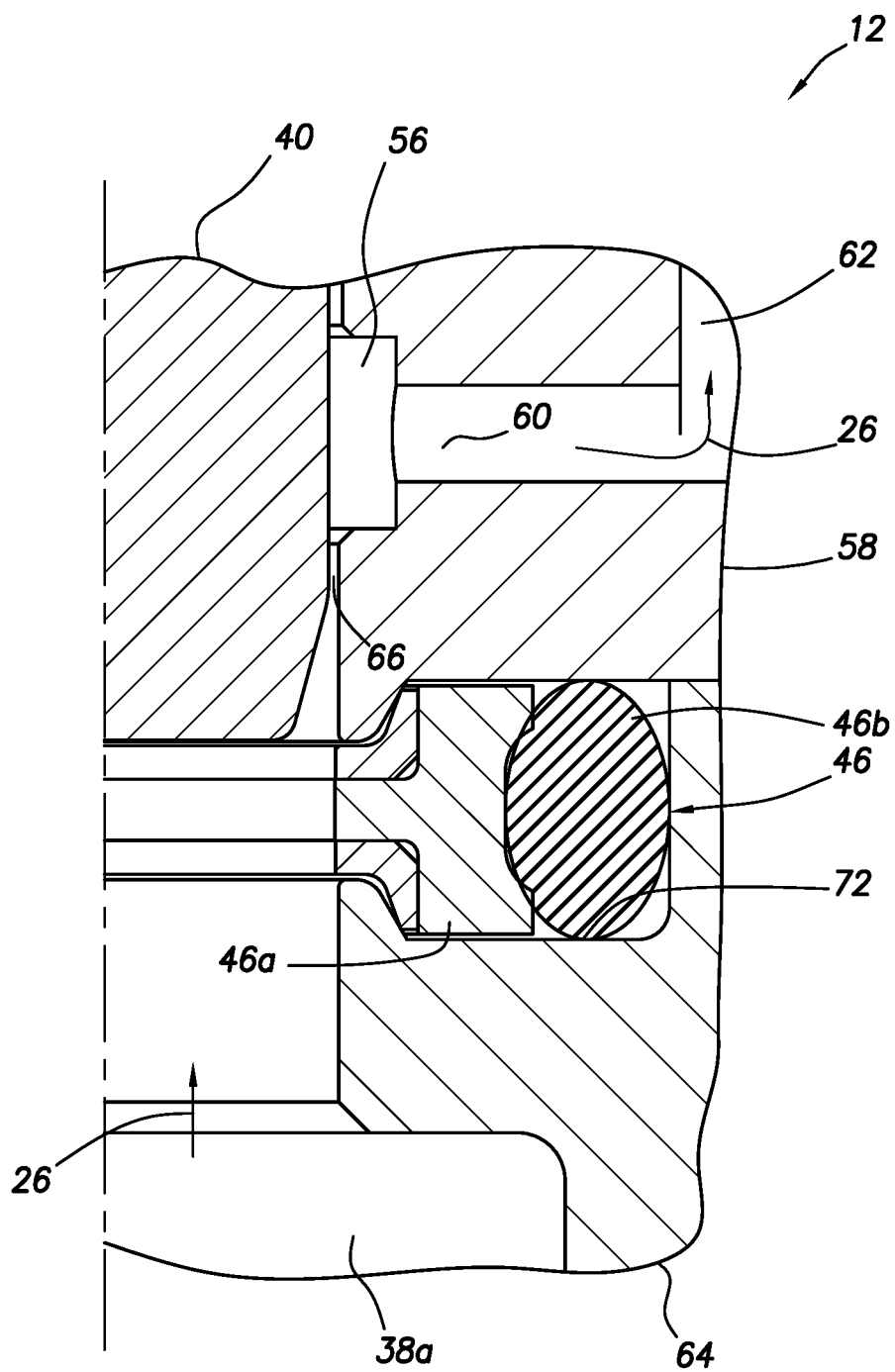
FIG. 5 is a representative cross-sectional view of a portion of another example of the chemical injection valve in a partially open configuration.

Referring additionally now to FIG. 5, a further enlarged cross-sectional view of a portion of the valve 12 is representatively illustrated. The stem 40 is in its partially open position as depicted in FIG. 5, with a lower end of the stem 40 disengaged from the primary seal 46, but still below the annulus 56.

Note that the chemical treatment 26 flows through the relatively thin (in a radial direction) annular gap 66 between the stem 40 and the housing 58. The gap 66 is spaced apart from the primary seal 46, and so erosion of the seal is mitigated.

The annular gap 66 in this example is positioned longitudinally between the annulus 56 and the primary seal 46. The gap 66 is preferably thinner radially as compared to the annulus 56.

The primary seal 46 in this example includes a resilient material 46a that is biased into sealing contact with the stem 40 in the closed position of the stem (see FIG. 3) by another resilient material 46b. A relatively rigid material 46c is provided on opposite longitudinal sides of the resilient material 46a for extrusion resistance, and for prevention of damage to the resilient material 46a when the stem 40 displaces downward into sealing engagement with the seal 46 and upward out of sealing engagement with the seal. However, the scope of this disclosure is not limited to use of any particular configuration or combination of materials in the primary seal 46.

Figure 6:
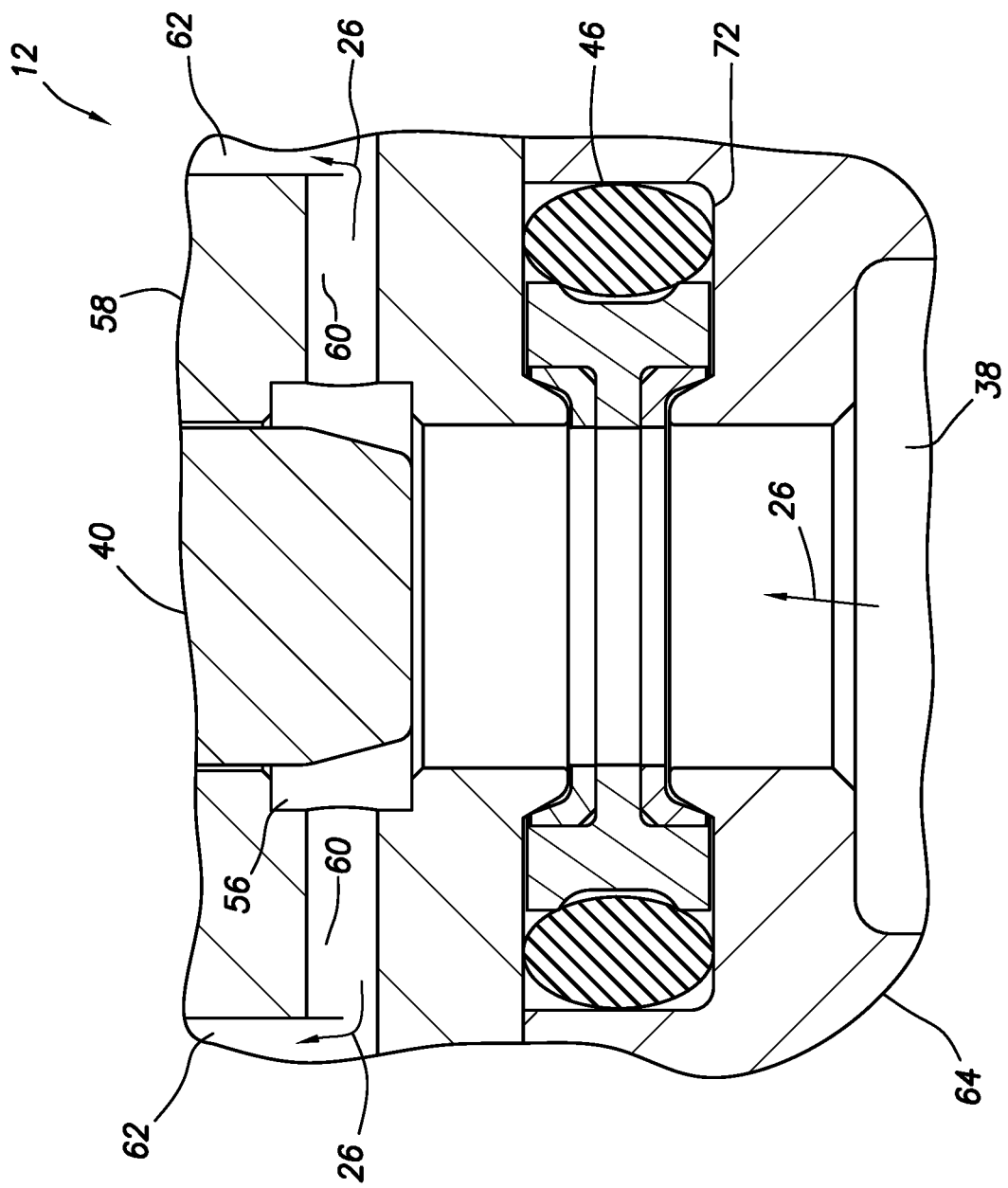
FIG. 6 is a representative cross-sectional view of a portion of another example of the chemical injection valve in an open configuration.

Referring additionally now to FIG. 6, another cross-sectional view of the valve 12 is representatively illustrated. In this view, the valve 12 is in its fully open configuration. The chemical treatment 26 can flow relatively freely through the flow passage 38.

As the pressure differential from below to above the stem 40 (at the interior surface 58a engaged by the secondary seals 54, 80, see FIG. 3) increases, the stem will displace further upward to provide less restriction to flow of the chemical treatment 26. As the flow restriction decreases, the pressure differential across the stem 40 also decreases.

Thus, the stem 40 will oscillate about an equilibrium position that permits the chemical treatment 26 to flow through the valve 12 at a flow rate determined by the output of the pump 28 (see FIG. 1). The restriction to flow at this flow rate can be adjusted using the stop 78 (see FIG. 2) to adjust the biasing force exerted by the biasing device 44.

It may now be fully appreciated that the above disclosure provides significant advancements to the art of constructing and operating chemical injection valves for use with subterranean wells. In examples described above, a chemical injection valve enhances control of chemical treatment injection and reduces erosion of seals.

A chemical injection valve 12 for use in a subterranean well is provided to the art by the above disclosure. In one example, the chemical injection valve 12 can include a valve stem 40 reciprocably disposed relative to at least one housing 58. The valve stem 40 is displaceable relative to the housing 58 between closed and open positions. Flow between first and second sections 38a,b of a flow passage 38 is selectively prevented and permitted in the respective closed and open positions.

A resilient primary seal 46 prevents flow through an annular gap 66 between the valve stem 40 and the housing 58 in the closed position. A bypass passage 60 is in communication with the annular gap 66 and the second flow passage section 38b. The bypass passage 60 is in communication with the first flow passage section 38a in the open position of the valve stem 40.

The annular gap 66 may be positioned longitudinally between the primary seal 46 and the bypass passage 60. The annular gap 66 may be positioned longitudinally between the primary seal 46 and an annulus 56 positioned between the valve stem 40 and the bypass passage 60. The bypass passage 60 may intersect the annulus 56 longitudinally between the primary and secondary seals 46, 54.

The "at least one" housing 58 can comprise first and second housings 58, 64. The primary seal 46 may be positioned in an annular recess 72 between the first and second housings 58, 64.

The chemical injection valve 12 may include a metal secondary seal 54a that prevents flow through an annular space 82 formed between the valve stem 40 and the housing 58.

The valve stem 40 may be disengaged from the primary seal 46 in the open position. The secondary seal 54 may be sealingly engaged in the open and closed positions.

The metal secondary seal 54 may be carried on the valve stem 40 and may sealingly engage an interior surface 58a of the housing 58. The metal secondary seal 54 may be in metal-to-metal sealing engagement with the interior surface 58a. The interior surface 58a may have an inside diameter that is greater than an inside diameter of the primary seal 46.

A chemical injection system 10 is also provided for use with a subterranean well. In one example, the system 10 can comprise a chemical treatment 26 pumped through a chemical injection valve 12 and into an interior of a tubular string 16 in the well.

The chemical injection valve 12 can include first and second flow passage sections 38a,b, a valve stem 40 reciprocable between closed and open positions to thereby respectively prevent and permit flow of the chemical treatment 26 between the first and second flow passage sections 38a,b, and a bypass passage 60 extending between the second flow passage section 38b and an annulus 56 surrounding the valve stem 40. The annulus 56 is positioned longitudinally between a resilient primary seal 46 and a metal secondary seal 54.

The valve stem 40 may sealingly engage the primary seal 46 in the closed position, and the valve stem 40 may be disengaged from the primary seal 46 in the open position. The valve stem 40 may be disengaged from the primary seal 46 in the open position, and the secondary seal 54 may be sealingly engaged in the open and closed positions.

An annular gap 66 between the valve stem 40 and a stem housing 58 may be positioned longitudinally between the annulus 56 and the primary seal 46. The annular gap 66 may be radially thinner than the annulus 56.

The valve stem 40 may be reciprocably disposed in at least one housing 58. The secondary seal 54 may prevent flow through an annular space 82 between the valve stem 40 and the housing 58.

The "at least one" housing 58 may comprise first and second housings 58, 64. The primary seal 46 may be positioned between the first and second housings 58, 64.

The secondary seal 54 may sealingly engage an interior surface 58a in the housing 58. The secondary seal 54 may be in metal-to-metal sealing engagement with the interior surface 58a.

The interior surface 58a may have an inside diameter that is greater than an inside diameter of the primary seal 46. The primary seal 46 may sealingly engage an outer diameter of the valve stem 40 in the closed position.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as, "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A chemical injection valve for use in a subterranean well, the chemical injection valve comprising:
    a tubular housing assembly, in which the chemical injection valve receives chemical treatment fluid via at least one inlet port formed radially through the housing assembly;
    a valve stem configured to reciprocate in a longitudinal bore of the housing assembly, in which the valve stem displaces relative to the housing assembly between closed and open positions, in which flow of the chemical treatment fluid from a first longitudinal flow passage section to a second longitudinal flow passage section of the chemical injection valve is selectively prevented and permitted in the respective closed and open positions, in which the valve stem closes the longitudinal bore in the closed position, and in which the valve stem displaces to the open position in response to an increase in pressure in the first flow passage section to at least a predetermined level;

a resilient primary seal that prevents the flow of the chemical treatment fluid through an annular gap between the valve stem and the housing assembly in the closed position of the valve stem; and a lateral bypass passage in communication with the annular gap and the second flow passage section in the closed position of the valve stem, and the bypass passage being in communication with the first flow passage section in the open position of the valve stem.

2. The chemical injection valve of claim 1, in which the annular gap is positioned longitudinally between the primary seal and the bypass passage.

3. The chemical injection valve of claim 1, in which the annular gap is positioned longitudinally between the primary seal and an annulus positioned between the valve stem and the bypass passage.

4. The chemical injection valve of claim 3, in which the bypass passage intersects the annulus longitudinally between the primary seal and a metal secondary seal.

5. The chemical injection valve of claim 1, in which the housing assembly comprises first and second housings, and in which the primary seal is positioned in an annular recess between the first and second housings.

6. The chemical injection valve of claim 5, further comprising a metal secondary seal that prevents flow through an annular space formed between the valve stem and the first housing.

7. The chemical injection valve of claim 6, in which the valve stem is disengaged from the primary seal in the open position, and in which the secondary seal is sealingly engaged in the open and closed positions.

8. The chemical injection valve of claim 6, in which the metal secondary seal is carried on the valve stem and sealingly engages an interior surface of the first housing.

9. The chemical injection valve of claim 8, in which the metal secondary seal is in metal-to-metal sealing engagement with the interior surface.

10. The chemical injection valve of claim 8, in which the interior surface has an inside diameter that is greater than an inside diameter of the primary seal.

11. A chemical injection system for use with a subterranean well, the system comprising:

a chemical treatment fluid; and a chemical injection valve configured to inject the chemical treatment fluid into an interior of a tubular string in the well, the chemical injection valve comprising a tubular housing assembly, in which the chemical injection valve receives the chemical treatment fluid via at least one inlet port formed radially through the housing assembly, first and second longitudinal flow passage sections, a valve stem configured to reciprocate in a longitudinal bore of the housing assembly, in which the valve stem displaces between closed and open positions to thereby respectively prevent and permit flow of the chemical treatment fluid from the first flow passage section to the second flow passage section, in which the valve stem closes the longitudinal bore in the closed position, and in which the valve stem displaces to the open position in response to an increase in pressure in the first flow passage section to at least a predetermined level, and a lateral bypass passage which communicates with the second flow passage section and an annulus surrounding the valve stem in the closed position of the valve stem, the annulus being positioned longitudinally between a resilient primary seal and a metal secondary seal.

12. The system of claim 11, in which the valve stem sealingly engages the primary seal in the closed position, and the valve stem is disengaged from the primary seal in the open position.

13. The system of claim 11, in which the valve stem is disengaged from the primary seal in the open position, and in which the secondary seal is sealingly engaged in the open and closed positions.

14. The system of claim 11, in which an annular gap between the valve stem and a stem housing is positioned longitudinally between the annulus and the primary seal, and the annular gap is radially thinner than the annulus.

15. The system of claim 11, in which the valve stem is reciprocably disposed in the housing assembly, and the secondary seal prevents flow through an annular space between the valve stem and the housing assembly.

16. The system of claim 15, in which the housing assembly comprises first and second housings, and in which the primary seal is positioned longitudinally between the first and second housings.

17. The system of claim 16, in which the secondary seal sealingly engages an interior surface in the first housing.

18. The system of claim 17, in which the secondary seal is in metal-to-metal sealing engagement with the interior surface.

19. The system of claim 17, in which the interior surface has an inside diameter that is greater than an inside diameter of the primary seal.

20. The system of claim 11, in which the primary seal sealingly engages an outer diameter of the valve stem in the closed position.

* * * * *